(12) United States Patent
Suzuki

(10) Patent No.: US 6,867,809 B1
(45) Date of Patent: Mar. 15, 2005

(54) SPEED CONTROL DEVICE FOR OPTICAL SYSTEM

(75) Inventor: Noboru Suzuki, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/447,788

(22) Filed: Nov. 23, 1999

(30) Foreign Application Priority Data

Nov. 30, 1998 (JP) .......................... 10-340145
Nov. 30, 1998 (JP) .......................... 10-340146

(51) Int. Cl.⁷ .................. H04N 5/232; G03B 13/00; G03B 13/34; G03B 3/10
(52) U.S. Cl. .................. 348/357; 348/347; 396/133
(58) Field of Search .................. 348/357, 347; 396/133

(56) References Cited

U.S. PATENT DOCUMENTS

| | | | | |
|---|---|---|---|---|
| 5,053,798 A | * | 10/1991 | Ohara et al. ................ 396/135 |
| 5,060,005 A | * | 10/1991 | Itoh et al. ................... 396/303 |
| 5,202,555 A | * | 4/1993 | Ishida et al. ............. 250/201.8 |
| 5,250,884 A | * | 10/1993 | Okumura .................... 318/560 |
| 5,323,200 A | | 6/1994 | Hirasawa .............. 351/195.12 |
| 5,369,461 A | * | 11/1994 | Hirasawa et al. ........... 396/135 |
| 5,387,960 A | | 2/1995 | Hirasawa et al. ........... 354/402 |
| 5,434,637 A | * | 7/1995 | Ohta ........................... 396/529 |
| 5,457,513 A | * | 10/1995 | Uenaka ......................... 396/95 |
| 5,498,944 A | * | 3/1996 | Nakata ........................ 318/640 |
| 5,572,279 A | * | 11/1996 | Ohsawa ........................ 396/52 |
| 5,604,560 A | * | 2/1997 | Kaneda ....................... 396/133 |
| 5,654,757 A | * | 8/1997 | Murakami et al. .......... 348/357 |
| 5,754,895 A | * | 5/1998 | Nishino ......................... 396/79 |
| 5,799,214 A | * | 8/1998 | Iwane ......................... 396/135 |
| 6,167,201 A | * | 12/2000 | Hara et al. .................... 396/77 |
| 6,169,578 B1 | | 1/2001 | Chigira ....................... 348/347 |
| 6,339,510 B1 | * | 1/2002 | Taniguchi et al. .......... 359/698 |
| 2002/0080247 A1 | * | 6/2002 | Takahashi et al. .......... 348/229 |

FOREIGN PATENT DOCUMENTS

| | | |
|---|---|---|
| JP | 04-100025 A | 4/1992 |
| JP | 07-325246 A | 12/1995 |
| JP | 08-029661 A | 2/1996 |
| JP | 08-327877 A | 12/1996 |

* cited by examiner

Primary Examiner—Wendy R. Garber
Assistant Examiner—James M. Hannett
(74) Attorney, Agent, or Firm—Morgan & Finnegan, L.L.P.

(57) ABSTRACT

This invention relates to a system for communicating speed data from a camera to a lens unit to drive the lens unit. Even if speed data changes stepwise, a change amount of the driving speed can be changed within a predetermined range for each stepwise change of the speed data in a whole driving speed change range. An optical apparatus having drive circuit for receiving speed data communicated from the unit which sends the speed data representing speed information and controlling, on the basis of the information, the speed of a moving member which moves within a predetermined range includes a determination circuit for determining a driving speed on the basis of position data, the speed data, and a value representing an actual range of the predetermined range, the position data defining the predetermined range as a predetermined number different from a value indicating the actual range and representing the predetermined number as another value in accordance with a time required to move the moving member within the predetermined range.

21 Claims, 9 Drawing Sheets

FIG. 6

| MOTOR GEAR DIAMETER φMotor [mm] | ENCODER GEAR DIAMETER φEnc [mm] | OUTPUT PULSE NUMBER PER ONE ROTATION OF ENCODER 2500 PPEnc [P/R] ||
|---|---|---|---|
| | | COUNTER PULSE NUMBER PPTotal [pulse] ||
| | | MOTOR ROTATION NUMBER FROM INF TO MOD ||
| | | NRot=20 | NRot=100 |
| 20 | 20 | 50000 | 250000 |
| 20 | 10 | 100000 | 500000 |
| 5 | 20 | 12500 | 62500 |

FIG. 7

| MOTOR GEAR DIAMETER φMotor [mm] | ENCODER GEAR DIAMETER φEnc [mm] | OUTPUT PULSE NUMBER PER ONE ROTATION OF ENCODER 2500 PPEnc [P/R] ||
|---|---|---|---|
| | | COUNTER PULSE NUMBER PPTotal [pulse] ||
| | | MOTOR ROTATION NUMBER FROM INF TO MOD ||
| | | NRot=20 | NRot=100 |
| 20 | 20 | 200000 | 1000000 |
| 20 | 10 | 400000 | 2000000 |
| 5 | 20 | 50000 | 250000 |

FIG. 9

WHOLE RANGE NORMALIZED POSITION : 30000

| SPEED COMMAND V SYNCHRONIZING UNIT | SPEED COMMAND CHANGING RATIO [%] | WHOLE RANGE MOVEMENT TIME [sec.] | |
|---|---|---|---|
| 1 | 100.00 | 500.00 | ⎫ |
| 2 | 50.00 | 250.00 | |
| 3 | 33.33 | 166.67 | |
| 4 | 25.00 | 125.00 | SPEED COMMAND |
| 5 | 20.00 | 100.00 | CHANGING RATIO |
| 6 | 16.67 | 83.33 | IS CONSIDERABLY |
| 7 | 14.29 | 71.43 | LARGE |
| 8 | 12.50 | 62.50 | |
| 9 | 11.11 | 55.56 | |
| 10 | 10.00 | 50.00 | ⎭ |
| ⋮ | ⋮ | ⋮ | |
| 25 | 4.00 | 20.00 | ⎫ |
| 26 | 3.85 | 19.23 | |
| 27 | 3.70 | 18.52 | |
| 28 | 3.57 | 17.86 | |
| 29 | 3.45 | 17.24 | SPEED COMMAND |
| 30 | 3.33 | 16.67 | CHANGING RATIO |
| 31 | 3.23 | 16.13 | IS WITHIN 5% |
| 32 | 3.13 | 15.63 | |
| 33 | 3.03 | 15.15 | |
| 34 | 2.94 | 14.71 | ⎭ |
| ⋮ | ⋮ | ⋮ | |
| 1635 | 0.061 | 0.306 | |
| 1636 | 0.061 | 0.306 | |
| 1637 | 0.061 | 0.305 | |
| 1638 | 0.061 | 0.305 | |
| 1639 | 0.061 | 0.305 | |
| 1640 | 0.061 | 0.305 | |
| 1641 | 0.061 | 0.305 | |
| 1642 | 0.061 | 0.305 | |
| 1643 | 0.061 | 0.304 | |
| 1644 | 0.061 | 0.304 | |

FIG. 10

| SPEED COMMAND V SYNCHRONIZING UNIT | SPEED COMMAND CHANGING RATIO [%] | WHOLE RANGE MOVEMENT TIME [sec.] | |
|---|---|---|---|
| | | WHOLE RANGE NORMALIZED PORTION 30000 | WHOLE RANGE NORMALIZED PORTION 500000 |
| 1 | 100.00 | 500.00 | 8333.33 |
| 2 | 50.00 | 250.00 | 4166.67 |
| 3 | 33.33 | 166.67 | 2777.78 |
| 4 | 25.00 | 125.00 | 2083.33 |
| 5 | 20.00 | 100.00 | 1666.67 |
| 6 | 16.67 | 83.33 | 1388.89 |
| 7 | 14.29 | 71.43 | 1190.48 |
| 8 | 12.50 | 62.50 | 1041.67 |
| 9 | 11.11 | 55.56 | 925.93 |
| 10 | 10.00 | 50.00 | 833.33 |
| ⋮ | ⋮ | ⋮ | ⋮ |
| 25 | 4.00 | 20.00 | 333.33 |
| 26 | 3.85 | 19.23 | 320.51 |
| 27 | 3.70 | 18.52 | 308.64 |
| 28 | 3.57 | 17.86 | 297.62 |
| 29 | 3.45 | 17.24 | 287.36 |
| 30 | 3.33 | 16.67 | 277.78 |
| 31 | 3.23 | 16.13 | 268.82 |
| 32 | 3.13 | 15.63 | 260.42 |
| 33 | 3.03 | 15.15 | 252.53 |
| 34 | 2.94 | 14.71 | 245.10 |
| ⋮ | ⋮ | ⋮ | ⋮ |
| 1635 | 0.061 | 0.306 | 5.097 |
| 1636 | 0.061 | 0.306 | 5.094 |
| 1637 | 0.061 | 0.305 | 5.091 |
| 1638 | 0.061 | 0.305 | 5.088 |
| 1639 | 0.061 | 0.305 | 5.084 |
| 1640 | 0.061 | 0.305 | 5.081 |
| 1641 | 0.061 | 0.305 | 5.078 |
| 1642 | 0.061 | 0.305 | 5.075 |
| 1643 | 0.061 | 0.304 | 5.072 |
| 1644 | 0.061 | 0.304 | 5.069 |
| ⋮ | ⋮ | ⋮ | ⋮ |
| 27365 | 0.004 | 0.018 | 0.305 |
| 27366 | 0.004 | 0.018 | 0.305 |
| 27367 | 0.004 | 0.018 | 0.305 |
| 27368 | 0.004 | 0.018 | 0.304 |
| 27369 | 0.004 | 0.018 | 0.304 |
| 27370 | 0.004 | 0.018 | 0.304 |

Rows 1–10: SPEED COMMAND CHANGING RATIO IS CONSIDERABLY LARGE

Rows 25–34: SPEED COMMAND CHANGING RATIO IS WITHIN 5%

Rows 27365–27370: SPEED COMMAND CHANGING RATIO IS SUBSTANTIALLY EQUAL TO 0%

FIG. 11

| SPEED COMMAND V SYNCHRONIZING UNIT | SPEED COMMAND CHANGING RATIO [%] | WHOLE RANGE MOVEMENT TIME [sec.] WHOLE RANGE NORMALIZED PORTION 1000 | WHOLE RANGE MOVEMENT TIME [sec.] WHOLE RANGE NORMALIZED PORTION 500000 | |
|---|---|---|---|---|
| 1 | 100.00 | 16.67 | 8333.33 | SPEED COMMAND CHANGING RATIO IS CONSIDERABLY LARGE |
| 2 | 50.00 | 8.33 | 4166.67 | |
| 3 | 33.33 | 5.56 | 2777.78 | |
| 4 | 25.00 | 4.17 | 2083.33 | |
| 5 | 20.00 | 3.33 | 1666.67 | |
| 6 | 16.67 | 2.78 | 1388.89 | |
| 7 | 14.29 | 2.38 | 1190.48 | |
| 8 | 12.50 | 2.08 | 1041.67 | |
| 9 | 11.11 | 1.85 | 925.93 | |
| 10 | 10.00 | 1.67 | 833.33 | |
| ⋮ | ⋮ | ⋮ | ⋮ | |
| 33 | 3.03 | 0.505 | 252.53 | IN CASE THAT NORMALIZED POSITION IS "1000", SINCE SPEED COMMAND CHANGING RATIO IS CLOSE TO "2%", SPEED COMMAND IS EASY TO DEAL WITH |
| 34 | 2.94 | 0.490 | 245.10 | |
| 35 | 2.86 | 0.476 | 238.10 | |
| 36 | 2.78 | 0.463 | 231.48 | |
| 37 | 2.70 | 0.450 | 225.23 | |
| 38 | 2.63 | 0.439 | 219.30 | |
| 39 | 2.56 | 0.427 | 213.68 | |
| 40 | 2.50 | 0.417 | 208.33 | |
| 41 | 2.44 | 0.407 | 203.25 | |
| 42 | 2.38 | 0.397 | 198.41 | |
| 43 | 2.33 | 0.388 | 193.80 | |
| 44 | 2.27 | 0.379 | 189.39 | |
| 45 | 2.22 | 0.370 | 185.19 | |
| 46 | 2.17 | 0.362 | 181.16 | |
| 47 | 2.13 | 0.355 | 177.30 | |
| 48 | 2.08 | 0.347 | 173.61 | |
| 49 | 2.04 | 0.340 | 170.07 | |
| 50 | 2.00 | 0.333 | 166.67 | |
| 51 | 1.96 | 0.327 | 163.40 | |
| 52 | 1.92 | 0.321 | 160.26 | |
| 53 | 1.89 | 0.314 | 157.23 | |
| 54 | 1.85 | 0.309 | 154.32 | |
| 55 | 1.82 | 0.303 | 151.52 | |
| 56 | 1.79 | 0.298 | 148.81 | |
| 57 | 1.75 | 0.292 | 146.20 | |
| 58 | 1.72 | 0.287 | 143.68 | |
| 59 | 1.69 | 0.282 | 141.24 | |
| 60 | 1.67 | 0.278 | 138.89 | |

FIG. 12

V SYNCHRONIZING UNIT = 1/60 (sec.)

| | NORMALIZED SPEED COMMAND 50 [STEP/V SYNCHRONIZING UNIT] | |
|---|---|---|
| | WHOLE RANGE NORMALIZED POSITION FOR SPEED COMMAND | WHOLE RANGE MOVING TIME [sec.] |
| HIGH SPEED MOVEMENT SPEED COMMAND | 1000 | 0.33 |
| MIDDLE SPEED MOVEMENT SPEED COMMAND | 30000 | 10.00 |
| LOW SPEED MOVEMENT SPEED COMMAND | 500000 | 166.67 |

FIG. 13

| WHOLE RANGE NORMALIZED POSITION COMMAND | WHOLE RANGE NORMALIZED POSITION DATA |
|---|---|

A1H

| LOW SPEED MOVEMENT NORMALIZED SPEED COMMAND | NORMALIZED SPEED COMMAND DATA |
|---|---|

B1H

| MIDDLE SPEED MOVEMENT NORMALIZED SPEED COMMAND | NORMALIZED SPEED COMMAND DATA |
|---|---|

B2H

| HIGH SPEED MOVEMENT NORMALIZED SPEED COMMAND | NORMALIZED SPEED COMMAND DATA |
|---|---|

B3H

HEAD PORTION 8 BIT     DATA PORTION 16 BIT

SPEED CONTROL DEVICE FOR OPTICAL SYSTEM

BACKGROUND OF THE INVENTION

1. Field of the Invention

The present invention relates to an optical unit such as an image sensing lens used in television image sensing.

2. Related Background Art

A conventional broadcasting television camera system performs communication using an analog signal via a camera-lens interface. For example, voltages for determining the position of a focus lens or iris and the speed of a zoom lens are designated for a lens to control a lens system. Voltages representing the positions of a focus lens, zoom lens, and iris are applied to the camera side to transmit the lens information to the camera.

A lens uses an analog servo control system by constructing a feedback system using a potentiometer as a position sensor.

The types, number, and precision of analog signals are limited, and a serial interface tends to be used as a camera-lens communication function.

In the above control device, no normalization is performed in transmitting a data, such as the speed data, between the camera and lens, resulting in poor controllability.

SUMMARY OF THE INVENTION

One aspect of the application is to provide an optical apparatus having a drive circuit for receiving speed data communicated from a unit which sends the speed data representing speed information and controlling, on the basis of the information, the speed of a moving member which moves within a predetermined range, comprising a determination circuit for determining a driving speed on the basis of position data, the speed data, and a value representing an actual range of the predetermined range, the position data defining the predetermined range as a predetermined number different from a value indicating the actual range and representing the predetermined number as another value in accordance with a time required to move the moving member within the predetermined range so as to provide an appropriate driving speed.

One aspect of the application is to provide an optical apparatus having a drive circuit for receiving speed data communicated from a unit which sends the speed data representing speed information and controlling, on the basis of the information, the speed of a moving member which moves within a predetermined range, comprising a determination circuit for determining a driving speed on the basis of position data and the speed data, the position data representing the predetermined range as a predetermined number and the number as another value in accordance with a time required to move the moving member within the predetermined range so as to provide an appropriate driving speed.

One aspect of the application is to provide an optical unit having a moving member moving within a predetermined range and a drive circuit for controlling a speed of the moving member, wherein the speed of the moving member is determined on the basis of position data representing the predetermined range as a predetermined number of steps and speed data representing a moving amount per unit time as the predetermined number of steps.

The above and other objects, features, and advantages of the present invention will be apparent from the following detailed description of the preferred embodiment in conjunction with the accompanying drawings.

BRIEF DESCRIPTION OF THE DRAWINGS

FIG. 6 is a pulse number table 1 of the first embodiment;

FIG. 7 is a pulse number table 2 of the first embodiment;

FIG. 9 is a normalized speed command table of the first embodiment;

FIG. 10 is another normalized speed command table of the first embodiment;

FIG. 11 is still another normalized speed command table of the first embodiment;

FIG. 12 is a table representing the whole range movement time with respect to the normalized speed command of the first embodiment; and FIG. 13 is a view for explaining the normalized positions and speed commands of the first embodiment.

DESCRIPTION OF THE PREFERRED EMBODIMENT (First Embodiment)

Figure 1:
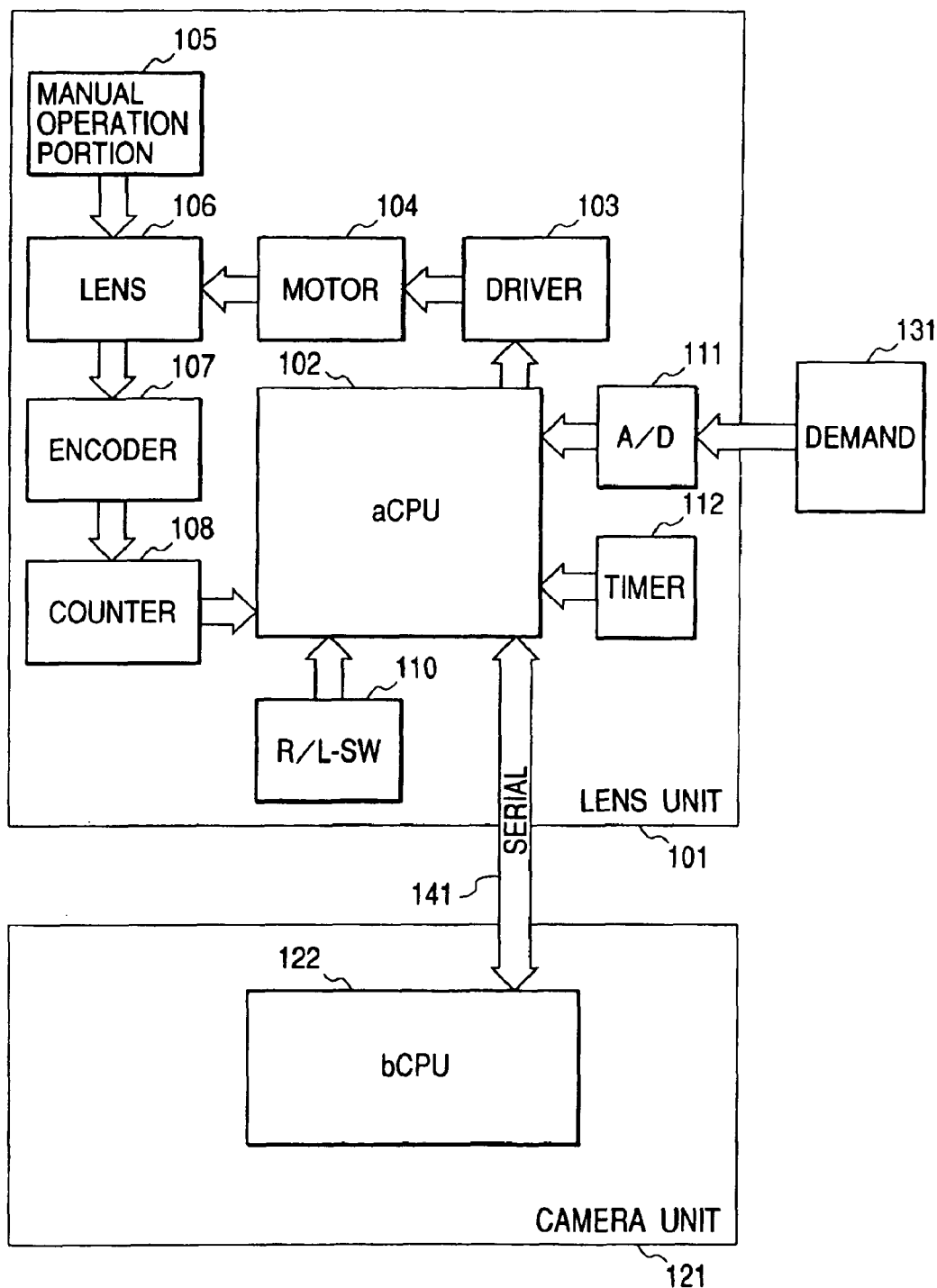
FIG. 1 is a block diagram showing the system configuration of the first embodiment of the present invention.

FIG. 1 is a block diagram showing an optical system according to the first embodiment of the present invention. The optical system comprises a lens unit 101 for image sensing and camera unit 121 for sensing an image through the lens unit 101.

A controller (to be referred to as an aCPU hereinafter) 102 manages the lens unit and controls the servo system. A driver 103 drives a motor 104. An optical lens 106 is connected to the motor 104. An encoder 107 detects the position of the optical lens 106 and outputs the pulse number corresponding to the moving amount of the lens. A counter 108 counts outputs (pulses) from the encoder 107.

A timer 112 and the counter 108 are connected to the aCPU 102. The aCPU 102 uses the values of the counter 108 and timer 112 to detect the position and speed of the optical lens 106.

A manual operation portion 105 manually operates the optical lens 106. A switch (to be referred to as an R/L-SW hereinafter) 110 selects control of the lens unit 101 in the remote or local mode. A demand 131 is connected to an A/D converter 111 in the lens unit 101. The A/D converter 111 A/D-converts a command from the demand 131. A demand command value for controlling the optical lens 106 can be input to the aCPU 102.

A camera controller (to be referred to as a bCPU hereinafter) 122 is mounted in the camera unit 121 and performs serial communication 141 with the aCPU 102 of the lens unit 101.

The remote and local modes selectively set by the R/L-SW 110 will be described below. The remote mode is to control the optical lens 106 in accordance with a control command from the bCPU 122 in the camera unit 121. The local mode is to control the optical lens 106 by selecting a control command from the demand 131.

Figure 5:
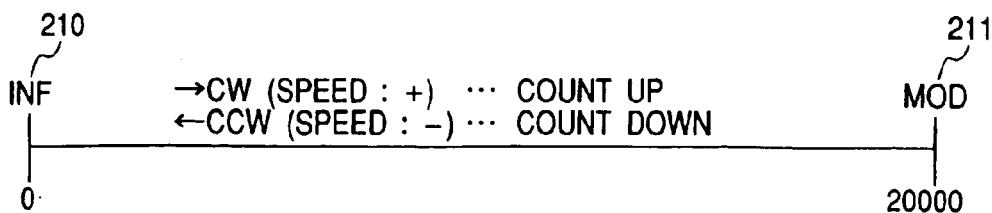
FIG. 5 is a view showing the lens moving direction of the first embodiment.

The relationship between the moving direction of the optical lens 106 and the count value of the counter 108 will be described with reference to FIG. 5. Assume that the optical lens 106 is a focus lens.

If the count value of the counter 108 at the infinity (INF) end 210 of the focus lens is defined as 0, the count value of the counter 108 at the minimum object distance (MOD) end 211 is 20,000.

When the focus lens rotates in the clockwise (CW) direction, the focus lens moves to the MOD end 211 direction to increment the counter 108. When the focus lens rotates in the counterclockwise (CCW) direction, the focus lens moves to the INF end 210 direction to decrement the counter 108.

During which the focus lens is moving in the MOD end 211 direction, the speed of the focus lens takes a positive value. During which the focus lens is moving in the INF end 210 direction, the speed of the focus lens takes a negative value.

Figure 2:
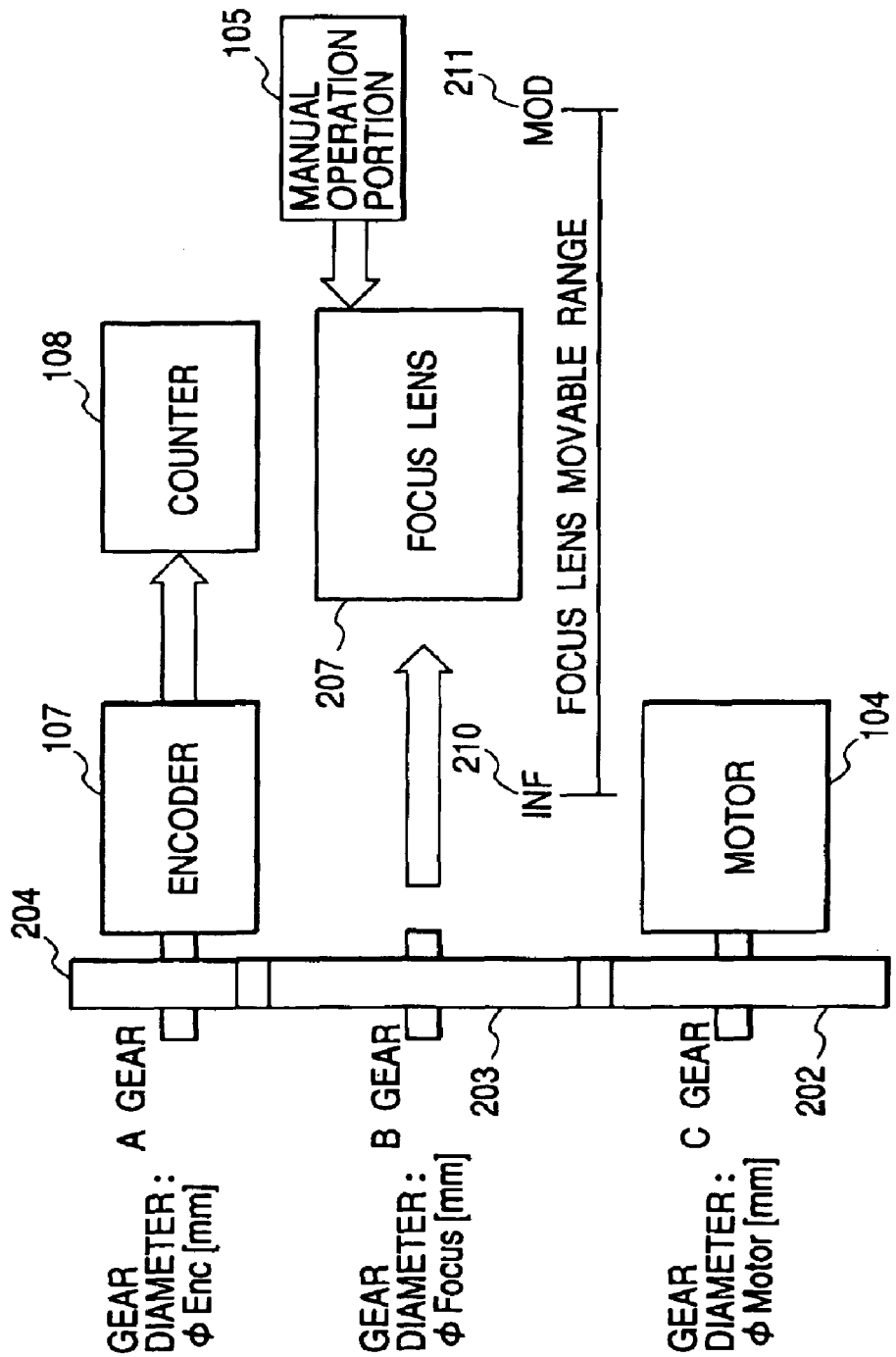
FIG. 2 is a block diagram showing an encoder pulse output mechanism in FIG. 1.

The encoder pulse output mechanism for detecting the position and speed of the focus lens will be described with reference to FIG. 2.

The diameter of a C gear 202 mounted on the drive motor 104 is φMotor [mm], and the diameter of a B gear 203 meshed with the C gear 202 is φFocus [mm]. A focus lens 207 can move from the INF end (infinity) 210 to the MOD (minimum object distance) end 211 by B gear 203.

The B gear 203 is meshed with an A gear 204 mounted on the encoder 107, and a pulse output from the encoder 107 is input to the counter 108. The diameter of the A gear 204 is φEnc [mm], and the output pulse per rotation of the encoder 107 is PPEnc [P/R]. The focus lens 207 can be moved from the INF end 210 to the MOD end 211 by using the manual operation portion 105.

A servo/manual mode selection SW (not shown) is arranged. In the servo mode, the focus lens 207 is driven by the motor 104. In the manual mode, the focus lens 207 can be operated by using the manual operation portion 105.

A clutch (not shown) is connected to the motor 104. In the manual mode, the encoder 107 rotates in accordance with movement of the focus lens 207. However, the driving force of the motor 104 is not transmitted to the focus lens 207 by the clutch.

In the above arrangement, the counter 108 represents the following count value PPRot per rotation of the motor 104:

$$PPRot = \phi Motor / \phi Enc \times PPEnc \quad (1)$$

If the rotation number of the motor 104 for moving the focus lens 207 from the INF end 210 to the MOD end 211 is defined as NRot, an output pulse number PPTotal of the encoder 107, which is generated when the focus lens 207 moves from the INF end 210 to the MOD end 211, is given as follows:

$$PPTotal = PPRot \times NRot \quad (2)$$

The count of the counter 108 which counts the output pulses from the encoder 107 upon moving the focus lens 207 from the INF end 210 to the MOD end 211 is calculated using equations (1) and (2) under the following conditions.
[Conditions]
Output Pulse Number per Rotation of Encoder 107
PPEnc=2500 [P/R]
Diameter of A Gear Mounted on Encoder 107
φEnc=10 [mm]

Diameter of C Gear Mounted on Motor 104
φMotor=20 [mm]
Rotation Number of Motor 104 for Moving Focus Lens 207 from INF End 210 to MOD End 211
100 [rotations].

At this time, when the count value of the counter 108 at the INF end 210 is set to "0", the count value PPTotal of the counter 108 at the MOD end 211 is given as follows:

$$PPTotal = 20/10 \times 2500 \times 100 = 500000 [Pluses]$$

Similarly, the calculation examples of the count values PPTotal upon changes in PPEnc, φEnc, φMotor, and NRot are shown in FIG. 6.

Figure 8A:
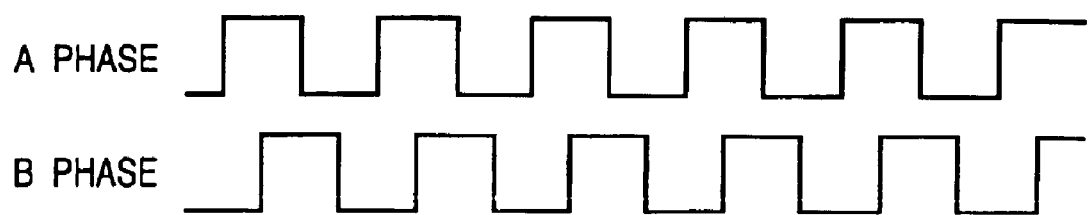
FIGS. 8A and 8B are waveform charts in the CW and CCW directions, respectively.
Figure 8B:
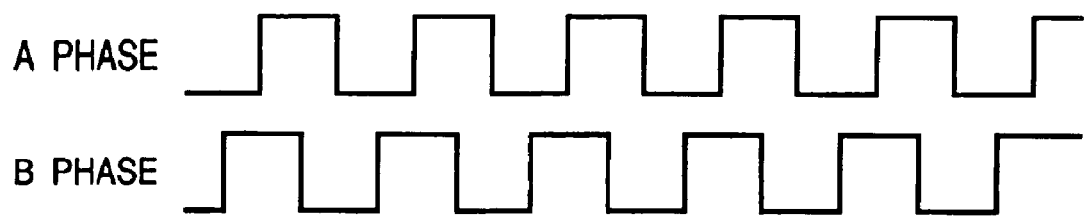

An output from the encoder 107 is generally obtained by a two-phase output scheme for generating A- and B-phase outputs having a phase difference of 90°. When the encoder 107 rotates in the CW direction, the A phase advances from the B phase by 90°, as shown in FIG. 8A. When the encoder 107 rotates in the CCW direction, the A phase delays from the B phase by 90°, as shown in FIG. 8B.

To cope with this, the counter 108 detects the edges of the A and B phases and counts the A- and B-phase pulses. As a result, the counter 108 counts 4-fold values. When the A phase advances from the B phase, the counter 108 increments the value. When the A phase delays from the B phase, the counter 108 decrements the value. The 4-fold value count result is shown in FIG. 7.

As described above, the count value PPTotal of the counter 108 in the movable range of the focus lens 207 between the INF end 210 and MOD end 211 is influenced by the rotation number NRot of the motor 104 depending on the movable range of the focus lens, the diameter φMotor of the C gear 202 mounted on the motor 104, the diameter φEnc of the A gear mounted on the encoder 107, and the output pulse number PPEnc per rotation of the encoder 107. The count value PPTotal has a considerably wide range.

Figure 3:
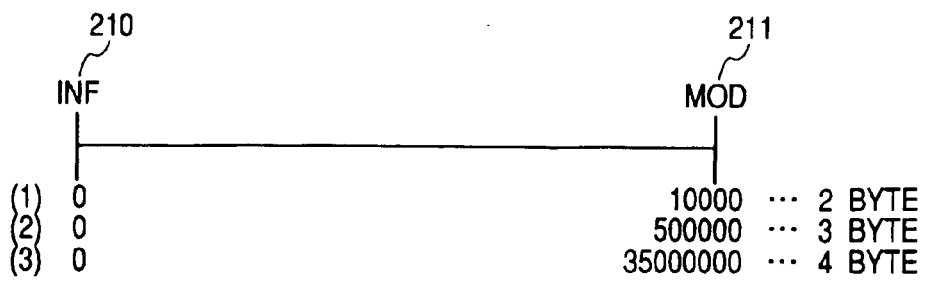
FIG. 3 is a view for explaining the output pulse number of an encoder in FIG. 1.

The pattern of the count value of the counter 108 at the MOD end 211, as shown in FIG. 3, when the INF end 210 is defined as a reference value "0" (count value of the counter 108) for the focus lens 207 will be described below.

For example, when the count values of the counter 108 at the MOD end 211 are given as 10,000, 500,000, and 35,000,000, the numbers of bytes required for these count values are given as follows:

(1) 2 bytes for 10,000 [pulses]

(2) 3 bytes for 500,000 [pulses]

(3) 4 bytes for 35,000,000 [pulses].

This indicates that data changes depending on the types of lens units 101 when the bCPU 122 of the camera unit 121 designates the position of the focus lens 207 using serial communication 141. For example, when the bCPU 122 designates via the serial communication 141 that the focus lens 207 is moved to a position of 5,000, the aCPU 102 of the lens unit 101 moves the lens unit 101 as follows:

5000/10000=0.5 (=50 [%]) for (1); the focus lens 207 is moved to the center between the INF end 210 and MOD end 211.

5000/500,000=0.01=(=1[%]) for (2); the focus lens 207 is moved to a position near the INF end 210.

5000/350,00000−0.00014(=0.014 [%]) for (3); the focus lens 207 is rarely moved from the INF end 210.

As can be apparent from the above result, the bCPU 122 of the camera unit 121 must know the resolution (pulse number of the whole movable range from the INF end 210 to the MOD end 211) of the effective movable range of the focus lens 207 of the lens unit 101. The bCPU 122 obtains the resolution by information exchange via the serial communication 141 when initialization of the camera unit 121 and lens unit 101 is complete. A description will be made for, e.g., (2). When the bCPU 122 of the camera unit 121 requests position resolution information of the focus lens 101 to the aCPU 102 of the lens unit 101 via the serial communication 141, the aCPU 102 transfers the positions of the INF end 210 and MOD end 211 as "0" and "500,000", respectively, to the bCPU 122 of the camera unit 121 via the serial communication 141.

As can be apparent from (1) to (3), the numbers of bytes of position information of the focus lens 207 are different from each other. This indicates that the data length necessary for arithmetic operation of the bCPU 122 of the camera unit 121 changes depending on the types of lens units 101.

Assume that the bCPU 122 of the camera unit 121 is a 16-bit microcomputer. In this case, arithmetic processing for (1) can be performed with a 2-byte (16 bits, int) length. Arithmetic processing for (2) requires a 4-byte (32 bits, long) length. Arithmetic processing for (3) must be performed with the floating point (float). Arithmetic processing often requires high speed, processing must be performed with the fixed decimal point as much as possible. Arithmetic processing is desirably possible with int (16-bit data length for a 16-bit microcomputer; 32-bit data length for a 32-bit microcomputer).

Figure 4:
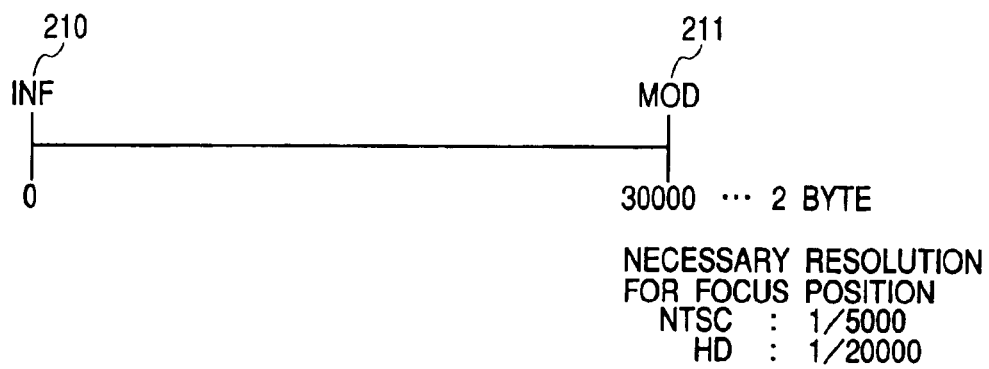
FIG. 4 is a view for explaining the number of normalization steps in the first embodiment.

As shown in FIG. 4, the resolutions between the INF end 210 and MOD end 211 are normalized, and fixed data is always used to give a position command between the lens unit 101 and camera unit 121 via the serial communication 141.

This makes it possible for the camera unit 121 not to consider the resolution of the focus lens 207 depending on the types of lens units 101.

The position resolution required for the focus lens 207 will be described below. The resolution calculated by the MTF and sensitivity is said to be about 1/5000 for NTSC and about 1/20,000 for HD.

Assume that the whole range, INF end 210, and MOD end 211 are given by 30,000, "0", and "30,000", respectively. A sufficient resolution can be obtained for the focus lens 207.

When the position command for the focus lens 207 is given as "15,000", the aCPU 102 of the lens unit 101 moves the focus lens 207 to positions having the following ratios using the above normalized data:

(10000×15000/30000)/10000=0.5 for (1)
(500000×15000/30000)/500000=0.5 for (2)
(35000000×15000/30000)/35000000=0.5 for (3).

The aCPU 102 can move the focus lens 207 to the middle position between the INF end 210 and MOD end 211 regardless of the types of lens units 101 (pulse number from the INF end 210 to MOD end 211 of the focus lens 207).

The normalized position information may be exchanged using the serial communication 141 after initialization of the lens unit 101 and camera unit 121 is complete. Alternatively, the normalized position information may be predetermined by information communication format between the lens unit 101 and camera unit 121.

The following equation is used to calculate a command position PPFocus Cmd of the focus lens 207 in the lens unit 101 in accordance with the normalized position command:

$$PPFocus\ Cmd = PPInfMod \times NorFocus\ Cmd / NorInfMod \quad (3)$$

where NorInfMod is the whole range normalized position between the INF and MOD ends, PPInfMod is the effective pulse number between the INF and MOD ends, and NorFocus Cmd is the normalization position command.

The following equation is used to obtain the normalized position information NorFocusInf from the current position PPFocusInf of the focus lens 207:

$$NorFocusInf = NorInfMod \times PPFocusInf / PPInfMod \quad (4)$$

If this normalized position information NorFocusInf is transferred from the lens unit 101 to the camera unit 121 using the serial communication 141, the camera unit 121 can detect the position of the focus lens 207 regardless of the types of lens units 101.

A speed command will be described with reference to FIG. 9. A system is generally incorporated in a video camera using a signal synchronized with image data for performing image processing. In this case, a vertical synchronizing signal (V synchronizing signal) as one frame of an image signal is used.

The V synchronizing signal has a period of 1/60 [sec] for NTSC, 1/50 [sec] for PAL, and 1/60 [sec] for HD. The speed command and speed information are preferably the speed data of the V synchronizing unit. A case using the speed data of the V synchronizing unit will be described below.

The whole range normalized position, i.e., normalized step number of movable range for lens, for speed is given as "30,000". The absolute value of the speed command of the minimum unit is "one step/V synchronizing unit". The next speed is "two steps/V synchronizing unit". At this time, a change in minimum speed is "+one step/V synchronizing unit". If the current speed command is given as "N steps/V synchronizing unit", the minimum speed command changing ratio is $(1/N) \times 100$ [t]. The table of this result is shown in FIG. 9.

As can be apparent from this table, when the speed command of the V synchronizing unit falls within the range of about 1 to 10, the speed changing ratio is considerably large. When the speed command is about 25 or more, the changing ratio falls within the range of 5 [%] or less.

When the speed command becomes about 1,600, the speed changing ratio rarely changes (the changing ratio is small). Values required as speeds of TV lenses generally fall within the whole range movement time range of 0.3 [sec] to 300 [sec], and have a value 1,000 times as the dynamic range. The whole range movement time can be calculated by the following equation:

$$\text{(Whole Range Movement Time [sec])} = \text{(Whole Range Normalized Position for Speed)}/\text{(Normalized Speed Command (Step Number))} \times \text{(V Synchronizing Unit) [sec]} \quad (5)$$

As described above, the speed is defined using the whole range normalized position for speed (range information defining the movable range as the predetermined range regardless of the actual movable range). Even if a lens having another movable range is mounted on a camera, processing can be performed using the whole range movement time as a constant time if a speed command from the camera is kept unchanged.

As described above, processing can be performed using the whole range movement time as the constant value when the speed command is kept unchanged. When the minimum unit of the speed command changes, a large speed command value has a speed changing ratio different from that of a small speed command value.

More specifically, in control using equation (5), a sufficient speed resolution is obtained on the high speed movement side (the speed command resolution is 0.06 [%] in the whole range movement time of about 5 [sec]). The practical range on the low speed movement side has the whole range movement time of about 20 sec (speed resolution of about 4 [%]). That is, a changing ratio becomes 50 [%] in the whole range movement time of 250 [sec]. The changing ratio is too large in the practical range. The practical use limits the speed changing ratio of 5 [%] or less because the speed changing ratio exceeding this range is too large to use.

FIG. 10 shows a case in which the whole range normalized position for speed is set to "500,000". In this case, the speed command becomes about 25 [steps/V synchronizing unit] near the whole range movement time of about 300 [sec]. Therefore, the speed changing ratio can fall within the range of 5 [t] or less.

Since the speed command on the high speed movement side (whole range movement time of 0.3 [sec]) is 27,400 [steps/V synchronizing unit] or less, the corresponding speed command falls within the 16-bit range from the high speed to the low speed.

When the whole range normalized position for speed is set to "500,000", the speed changing ratio on the high speed movement side is very small, and a command for commanding high speed movement is hard to process. The list of speed commands for the whole range normalized position of "1000" for high speed movement is shown in FIG. 11. As can be apparent from this table, the speed changing ratio on the high speed movement (whole range movement time of 0.5 [sec] or less) side is about 2 to 3 [%], and the high speed movement speed commands can be easily processed.

Similarly, it is possible to obtain a whole range normalized position for middle speeds.

Differences occurring when the same normalized speed command is given to high, middle, and low speed movement speed commands will be described with reference to FIG. 12.

The whole range movement times are calculated under the assumptions that the high, middle, and low speed movement speed commands take "1,000", "30,000", and "500,000" as whole range normalized positions, respectively. Since a speed changing ratio that facilitates speed operation when applying a speed command is considered to be about 2 [%], the normalized speed command is defined as 50 (steps/V synchronizing unit=1/60 [sec]) corresponding to the speed changing ratio of 2 [%].

The whole range movement times for the high, middle, and low speed movement speed commands are 0.33 [sec], 10.00 [sec], and 166.67 [sec], respectively. That is, the lens can be driven selecting a high, middle, and low speed movement speed command in consideration of the speed changing ratio at which easy operation is allowed. A speed command is given in consideration of the speed resolution, thereby allowing smooth lens control.

The format of the command will be described with reference to FIG. 13. As a scheme for sending a command from the camera unit 121 to the lens unit 101, a format made up of an 8-bit head portion and 16-bit data portion is employed.

In this case, the head portion is assigned for a movement command of lens 106 and the data portion is assigned for a command information. For example, the movement command A1H is defined as a normalized position command. In this case, B1H (corresponding to 500,000 described above and representing low speed movement whole range normalized position), B2H (corresponding to 30,000 described above and representing middle speed movement whole range normalized position), and B3H (corresponding to 1000 described above and representing the high speed movement whole range normalized position) are assigned to low, middle, and high speed whole range normalized speed commands, respectively.

The data portion is assigned for the normalized position command which contains position information representing a position at which the lens 106 is to be stopped.

The data portion in case of the normalized speed command contains a value determined in consideration of the direction of the movement step number of the V synchronizing unit. In this case, the direction takes a positive (+) value when the focus lens 207 is moved toward the MOD end 211 and a negative (−) value when the lens 207 is moved toward the INF end 210.

The normalized speed command can take values falling within the range of "−2,000 [steps/V synchronizing unit]" to "+2,000 [steps/V synchronizing unit]" at the speed command whole range normalized position of 30,000 and the maximum speed data of the whole range movement time of about 0.3 [sec].

The speed command whole range normalized position may be predetermined for a speed command (head portion) or may be determined by initial communication between the lens unit 101 and camera unit 121.

More specifically, when a speed command is sent for the whole range normalized position from the camera unit to the lens unit, predetermined data corresponding to the speed commands are stored in the lens unit as "500,000" for low speed movement and "30,000" for middle speed movement. Data may be selected in accordance with the communicated command. Alternatively, data may be paired with a command and communicated from the camera unit to the lens unit.

Speed control of the lens to which the normalized speed command (whole range normalized position) and normalized speed command are communicated as described above will be described below.

For example, when the lens is to be driven at high speed, "1000" and "50" are given as the whole range normalized position and the normalized speed command, respectively. These data are communicated from the camera unit to the lens unit, and the speed of the lens unit is controlled under the above conditions. In this case, if the original whole range movement distance of the lens unit is X (fixed), since the whole range normalized position is "1,000" and the movement time per step is 1/60 sec, the driving speed is represented by equation X/1000×60×50.

The speed of the lens drive (motor) is defined as X/[whole range normalized position]×[normalized speed command]×[V synchronizing unit], in accordance with the above normalized speed command and whole range normalized position. The lens side performs the above calculation in accordance with the whole range normalized position and normalized speed command from the camera unit, thereby determining the motor speed and performing speed control.

The normalized speed command preferably has a value range so that the speed changing ratio falls within the range of 2 to 3%.

A speed command as a command sent from the camera unit 121 to the lens unit 101 has been described with reference to FIGS. 9 to 13. Speed information of the lens 106 of the lens unit 101 may be similarly defined as described above and sent to the camera unit 121.

The "V synchronizing unit" has been used as the time-axis unit of the speed command or speed information. However, any other unit may be used.

The focus lens has been described as the lens 106 of the lens unit 101. However, the present invention is also applicable to any other optical system such as a zoom lens or iris.

The present invention is also applicable to an accessory except the camera unit. The encoder is used as a means for detecting the lens position. However, a combination of a potentiometer and A/D converter may be used. The position command normalized positions and speed command normalized positions are exemplified by values "30,000", "50,000", and "1,000". The values are not limited to these specific values, but can be replaced with other values. Serial communication is used in communication between the lens unit and camera unit. However, parallel communication can be used.

Communication using the position command normalized position and speed command normalized position is not limited to one between the lens unit 101 and camera unit 121. A command from the demand 131 serving as an accessory is input to the aCPU 102 of the lens unit 101 via the A/D converter 111. However, when a CPU is mounted in the demand 131 and has the same communication function as in the camera unit, it is possible to apply the above communication by normalizing the lens position and speed.

Communication upon normalizing the position and speed information of the lens 106 is also applicable to communication between the lens unit 101 and another system (including an accessory) like the camera unit 121.

As has been described above, according to the present invention, for example, in a combination of an image sensing lens and a camera or accessory, or in an image sensing lens itself, the speed of a moving member such as an optical system can be controlled using predetermined arithmetic processing regardless of the types of systems for driving lens systems.

What is claimed is:

1. An optical apparatus having a drive circuit for controlling a moving member of the optical apparatus which moves within a movable range, comprising:

a determination circuit which determines a driving speed of the moving member on the basis of position data that represents the movable range with a predetermined normalized value, speed data represented in accordance with a normalized speed changing ratio within the predetermined normalized value, and a value representing an actual moving range of the moving member within the movable range.

2. An apparatus according to claim 1, wherein said determination circuit determines the speed in accordance with a ratio of the value representing the actual range and the position data, and a value obtained by multiplying the speed data with the ratio.

3. An optical apparatus having a drive circuit for receiving speed data communicated from a unit which sends the speed data representing speed information and controlling, on the basis of the speed information, the speed of a moving member which moves within a movable range, comprising:

a determination circuit which determines a driving speed of the moving member on the basis of position information representing the movable range as a predetermined normalized number and a normalized speed changing ratio within the predetermined normalized number; and a changing circuit which changes the number of position information representing the movable range as another normalized number, in accordance with time information required to move the moving member within the movable range, wherein the drive circuit drives the moving member at a speed determined by said determination circuit.

4. An optical apparatus having a drive circuit for receiving speed data communicated from a unit which sends the speed data representing normalized speed information and controlling, on the basis of the normalized speed information, the speed of a moving member which moves within a movable range, comprising:

a determination circuit which determines a driving speed of the moving member on the basis of normalized position data and the normalized speed data, the position data representing the movable range as a normalized number predetermined in accordance with a time for moving the moving member within the movable range and the normalized speed data representing a normalized speed changing ratio within the predetermined normalized number, wherein the drive circuit drives the moving member at a speed determined by said determination circuit.

5. An apparatus according to claim 4, wherein the speed data represents a moving amount per unit time as a step number.

6. An apparatus according to claim 5, wherein the position data represents the movable range as a step number.

7. An apparatus according to claim 4, wherein said determination circuit determines the speed in accordance with a ratio of the speed data and position data.

8. An optical unit having a moving member moving within a movable range and a drive circuit for controlling a speed of the moving member, comprising:

a determination circuit which determines the speed of the moving member on the basis of position data representing the movable range as a predetermined normalized step number and speed data representing a normalized speed changing ratio within the predetermined normalized step number, wherein the step number of the position data representing the movable range is changed in accordance with a speed control state.

9. A unit according to claim 8, wherein the step number of the position data is changed in accordance with time information required to move the moving member within the movable range.

10. A unit according to claim 8, wherein the step number of the position data is so changed as to make a changing ratio of the speed of the moving member fall within a predetermined range with respect to a minimum change in speed data.

11. A unit according to claim 10, wherein the step number of the position data is changed in accordance with time information required to move the moving member within the movable range.

12. A unit according to claim 8, wherein said determination circuit determines the speed in accordance with a ratio of speed data and position data.

13. An optical unit having a moving member moving within a movable range and a drive circuit for controlling a speed of the moving member, comprising:

a speed control circuit which determines a speed of the moving member on the basis of position data representing the movable range as a predetermined normalized step number and speed data representing a a normalized speed changing ratio within the predetermined normalized step number; and a communication unit which communicates the position data from an apparatus connected to said optical unit.

14. A unit according to claim 13, wherein the step number of the position data changes in accordance with time information required to move the moving member within the movable range.

15. A unit according to claim 14, wherein the step number of the position data is so set as to fall a changing ratio of the speed of the moving member within the movable range with respect to a minimum change in speed data.

16. A unit according to claim 13, wherein said speed control circuit determines the speed in accordance with a ratio of speed data and position data.

17. A unit according to claim 13, wherein the speed data is communicated from the apparatus.

18. A unit according to claim 13, wherein said optical unit comprises a lens unit, and the apparatus comprises a camera.

19. An optical unit having a moving member moving within a movable range and a drive circuit for controlling a speed of the moving member, comprising:

a determination circuit which determines a speed of the moving member on the basis of position data representing the movable range as a predetermined normalized step number and speed data representing a a normalized speed changing ratio within the predetermined normalized step number, wherein the drive circuit drives the moving member at a speed determined by said determination circuit.

20. A unit according to claim 19, wherein the speed data is communicated from an apparatus connected to said optical unit.

21. A unit according to claim 20, wherein said optical unit comprises a lens unit, and the apparatus comprises a camera.

\* \* \* \* \*